(12) United States Patent
Gu et al.

(10) Patent No.: US 12,334,815 B2
(45) Date of Patent: *Jun. 17, 2025

(54) MULTI-PHASE INTERLEAVED POWER CONVERTERS WITH IMPROVED CURRENT BALANCING

(71) Applicant: Astec International Limited, Kowloon (HK)

(72) Inventors: Zhihua Gu, Kowloon (HK); Siu Chik Wong, Kowloon (HK); Kim Ly Kha, Kowloon (HK)

(73) Assignee: Astec International Limited, Kowloon (HK)

( * ) Notice: Subject to any disclaimer, the term of this patent is extended or adjusted under 35 U.S.C. 154(b) by 234 days.

This patent is subject to a terminal disclaimer.

(21) Appl. No.: 18/155,363

(22) Filed: Jan. 17, 2023

(65) Prior Publication Data

US 2023/0155486 A1 May 18, 2023

Related U.S. Application Data

(63) Continuation of application No. 16/747,262, filed on Jan. 20, 2020, now Pat. No. 11,557,961.

(51) Int. Cl.
*H02M 7/219* (2006.01)
*H02M 1/00* (2006.01)
*H02M 1/42* (2007.01)

(52) U.S. Cl.
CPC ....... *H02M 1/4233* (2013.01); *H02M 1/0032* (2021.05); *H02M 7/219* (2013.01)

(58) Field of Classification Search
CPC .. H02M 1/4233; H02M 1/0009; H02M 7/219; H02M 1/0032
See application file for complete search history.

(56) References Cited

U.S. PATENT DOCUMENTS

| | | | | |
|---|---|---|---|---|
| 2010/0019702 A1* | 1/2010 | Jang | .................... | G01R 19/0092 323/282 |
| 2012/0014148 A1* | 1/2012 | Li | ........................ | H02M 1/4216 363/78 |
| 2015/0180330 A1* | 6/2015 | Ye | ........................ | H02M 1/4208 363/126 |
| 2019/0052168 A1* | 2/2019 | Bhandarkar | ........ | H02M 1/4225 |

* cited by examiner

*Primary Examiner* — Alex Torres-Rivera

(57) ABSTRACT

A multi-phase interleaved PFC converter includes at least six switches coupled in a multi-phase interleaved circuit arrangement, and a control circuit. The control circuit is configured to turn on and turn off a first one of the switches according to a PWM signal to operate the first switch as an active switch having an off-time as a function of a duty cycle of the PWM signal, while turning on and turning off a second one of the switches as a synchronous switch. The control circuit is also configured to receive signal(s) indicative of currents in each phase of the interleaved circuit arrangement, set an on-time of the second switch equal to the off-time of the first switch when the signal(s) indicate continuous mode operation, and set the on-time of the second switch to a duration less than the off-time of the first switch when the signal(s) indicate discontinuous mode operation.

20 Claims, 6 Drawing Sheets

MULTI-PHASE INTERLEAVED POWER CONVERTERS WITH IMPROVED CURRENT BALANCING

CROSS-REFERENCE TO RELATED APPLICATIONS

This application is a continuation to U.S. application Ser. No. 16/747,262 filed Jan. 20, 2020. The entire disclosure of the above application is incorporated herein by reference.

FIELD

The present disclosure relates to multi-phase interleaved power converters having improved current balancing.

BACKGROUND

This section provides background information related to the present disclosure which is not necessarily prior art.

In a multi-phase interleaved power factor correction (PFC) converter, a choke current may become discontinuous at light loads or low input voltages near a zero crossing of the AC input. If a synchronous switch is on for a full period of the off-time of its corresponding active switch, a negative current may flow back to the AC input from a bulk output capacitor. The negative current may greatly increase a current imbalance between different phases in the converter.

SUMMARY

This section provides a general summary of the disclosure, and is not a comprehensive disclosure of its full scope or all of its features.

According to one aspect of the present disclosure, a multi-phase interleaved power factor correction (PFC) converter includes a pair of input terminals for receiving an alternating current (AC) voltage input from a voltage source, a pair of output terminals for supplying a direct current (DC) voltage output to a load, at least six switches coupled in a multi-phase interleaved circuit arrangement between the pair of input terminals and the pair of output terminals, and a control circuit coupled to the at least six switches. The control circuit is configured to, during a first polarity of the AC voltage input, turn on and turn off a first one of the at least six switches according to a pulse-width modulation (PWM) signal to operate the first switch as a power factor correction (PFC) active switch having an off-time as a function of a duty cycle of the PWM signal, while turning on and turning off a second one of the switches as a synchronous switch. The control circuit is also configured to receive one or more signals indicative of the currents in each phase of the interleaved circuit arrangement. In response to the signal(s) indicating that the converter is operating in a continuous mode, the control circuit is configured to set an on-time of the second switch equal to the off-time of the first switch, and in response to the signal(s) indicating that the converter is operating in a discontinuous mode, the control circuit is configured to set the on-time of the second switch to a duration less than the off-time of the first switch.

According to another aspect of the present disclosure, a method of controlling a multi-phase interleaved power factor correction (PFC) converter is disclosed. The converter includes a pair of input terminals for receiving an alternating current (AC) voltage input from a voltage source, a pair of output terminals for supplying a direct current (DC) voltage output to a load, and at least six switches coupled in a multi-phase interleaved circuit arrangement between the pair of input terminals and the pair of output terminals. The method includes, during a first polarity of the AC voltage input, turning on and turning off a first one of the at least six switches according to a pulse-width modulation (PWM) signal to operate the first switch as a power factor correction (PFC) active switch having an off-time as a function of a duty cycle of the PWM signal, while turning on and turning off a second one of the switches as a synchronous switch. The method also includes sensing a current indicative of a sum of the currents in each phase of the interleaved circuit arrangement, and in response to the sensed current indicating that the converter is operating in a continuous mode, setting an on-time of the second switch equal to the off-time of the first switch. The method further includes, in response to the sensed current indicating that the converter is operating in a discontinuous mode, setting the on-time of the second switch less than the off-time of the first switch.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Figure 1:
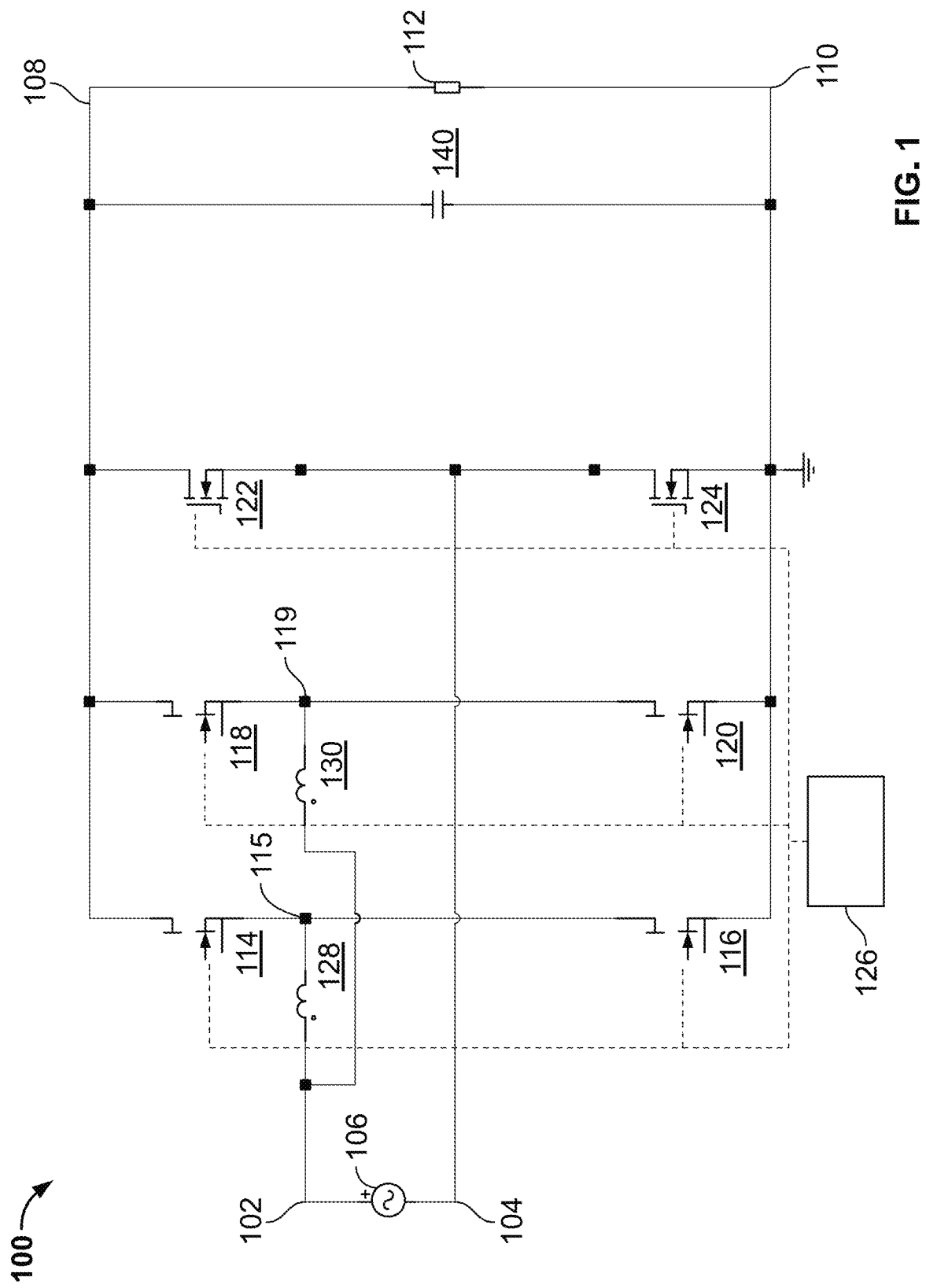
FIG. 1 is a circuit diagram of a multi-phase interleaved power converter, according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A multi-phase interleaved power factor correction (PFC) converter according to one example embodiment of the present disclosure is illustrated in FIG. 1 and indicated generally by reference number 100. The converter 100 includes a pair of input terminals 102 and 104 for receiving an alternating current (AC) voltage input from a voltage source 106, and a pair of output terminals 108 and 110 for supplying a direct current (DC) voltage output to a load 112.

The converter 100 includes six switches 114, 116, 118, 120, 122 and 124 coupled in a multi-phase interleaved circuit arrangement between the pair of input terminals 102, 104 and the pair of output terminals 108, 110. A control circuit 126 is coupled to the switches 114, 116, 118, 120, 122 and 124.

The control circuit 126 is configured to, during a first polarity of the AC voltage input 106, turn on and turn off the switch 114 according to a pulse-width modulation (PWM) signal to operate the switch 114 as a power factor correction (PFC) active switch having an off-time as a function of a duty cycle of the PWM signal, while turning on and turning off the switch 116 as a synchronous switch.

Figure 5:
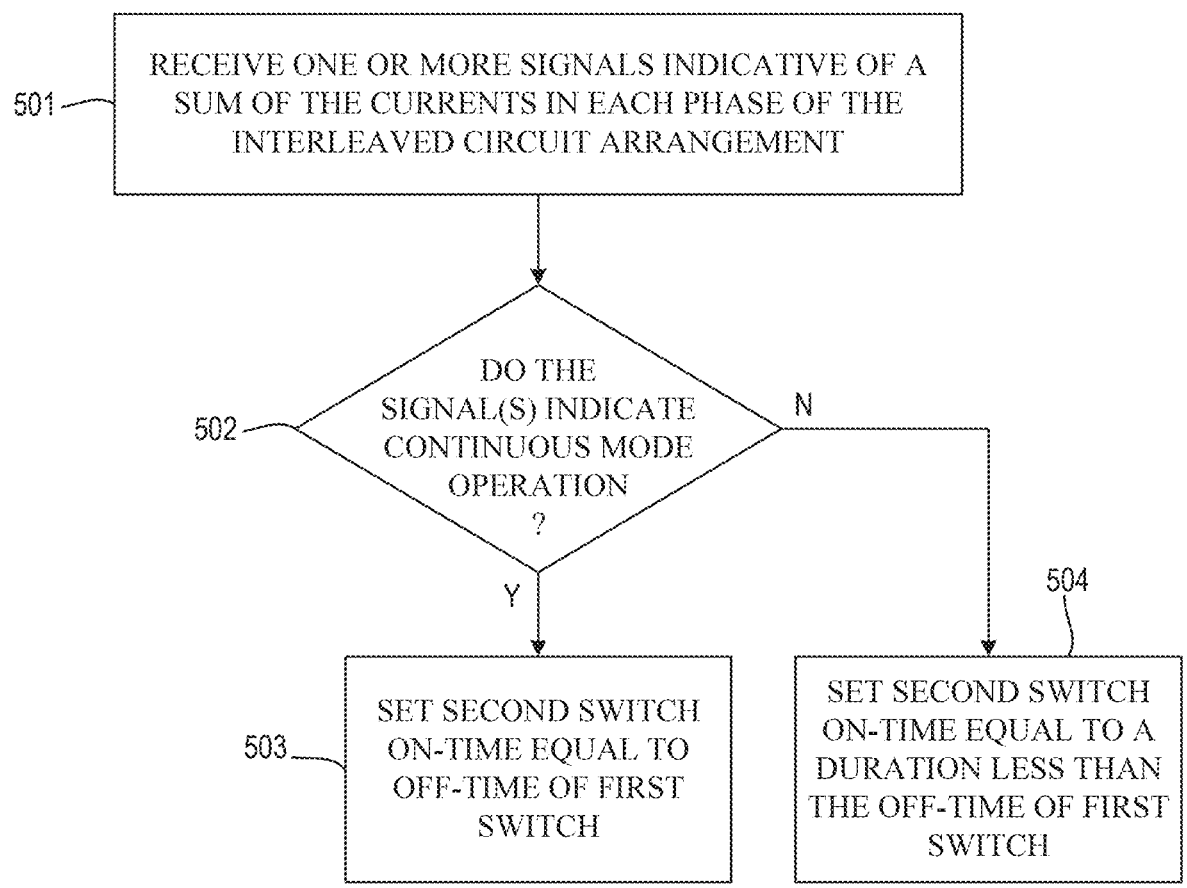
FIG. 5 is a flowchart of an example method for a multi-phase interleaved power converter according to one example of the present disclosure.
Figure 6:
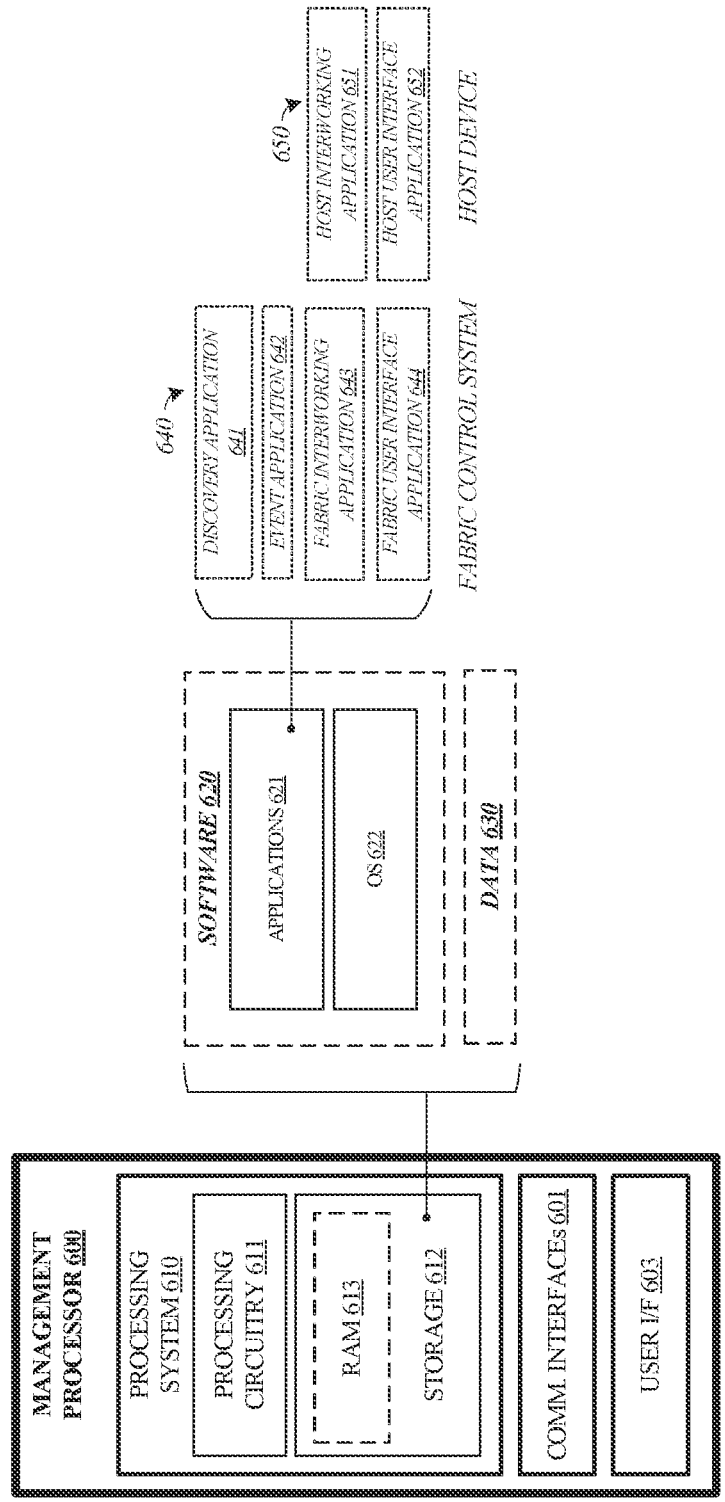

Referring to FIGS. 1 and 5, the control circuit 126 is also configured to receive (at step 501) one or more signals indicative of a sum of the currents in each phase of the interleaved circuit arrangement. In response to the signal(s) indicating (at step 502) that the converter 100 is operating in a continuous mode, the control circuit 126 is configured to set an on-time of the switch 116 equal to the off-time of the switch 114 at step 503. In response to the signal(s) indicating (at step 502) that the converter 100 is operating in a discontinuous mode, the control circuit 126 is configured to set the on-time of the switch 116 to a duration less than the off-time of the switch 114 at step 504.

The pair of switches 122 and 124 may form a leg of the bridge that is driven at a low frequency, such as a frequency of the AC voltage input 106 (e.g., sixty Hz, etc.). The pair of switches 114 and 116 may form another leg of the bridge that is driven at high frequency. The switches 114 and 116 may alternately operate as a power factor correction (PFC) active switch and a synchronous switch, depending on a polarity of the AC voltage input 106.

For example, when the AC voltage input 106 is positive, the switch 116 may operate as the active switch and the switch 114 may operate as the synchronous switch. When the AC voltage input 106 is negative, the switch 114 may operate as the active switch and the switch 116 may operate as the synchronous switch. In some embodiments, the active switch may be operated according to a pulse-width modulation (PWM) signal, the synchronous switch may be operated according to a bipolar PWM (BPWM) signal, etc., although any suitable control signals may be used for the active and synchronous switches.

In some operating conditions (e.g., a light load, a low input voltage near a zero crossing, etc.), a current in the converter 100 may become discontinuous, such as a choke current through the inductor 128. If the synchronous switch 114 or 116 is on for a full period of off-time of the corresponding active switch 114 or 116, a negative current may flow back to the AC voltage input 106 (e.g., from a bulk capacitor 140 in parallel with the output terminals 108 and 110, etc.). For a multi-phase interleaved totem-pole converter such as the converter 100 of FIG. 1, the negative current may greatly increase current imbalance between phases of the converter 100.

For example, if the inductor 128 and the switches 114 and 116 form a first phase of the converter 100, and the inductor 130 and the switches 118 and 120 form a second phase of the converter 100, a negative current in the inductor 128 or 130 may greatly imbalance the current between the inductors 128 and 130.

Negative current through the inductor 128 may be reduced (e.g., eliminated) by limiting the on-time of the synchronous switch 114 or 116 during discontinuous mode operation. For example, limiting the on-time of the synchronous switch 114 or 116 may inhibit negative current from building up in the phase of the converter 100 corresponding to switches 114 and 116.

The on-time (SynchSwitch_ON) of the synchronous switch 114 or 116 may be set according to the equation SynchSwitch_ON=Vac*D/(Vo−Vac), where D is the duty cycle for turn on of the corresponding active switch 114 or 116, Vac is a value of the AC voltage input (e.g., a current value, a maximum value, etc.), and Vo is a value of the DC voltage output (e.g., a current value, a maximum value, an RMS value, etc.). A maximum value of Vac may be less than the value of Vo.

In the above equation, SynchSwitch ON may be less than or equal to (1−D). For example, when the converter 100 is operating in a discontinuous mode, the on-time of the synchronous switch 114 or 116 may be shorter than the full period of the off-time of the corresponding active switch 114 or 116, with SynchSwitch_ON<(1−D). When the converter 100 is operating in a continuous mode, the on-time of the synchronous switch 114 or 116 may be equal to the full period of the off-time of the corresponding active switch 114 or 116, with SynchSwitch_ON=(1−D).

As shown in FIG. 1, the inductor 128 is coupled between the input terminal 102 and the switches 114 and 116, and the inductor 130 is coupled between the switches 118 and 120. The one or more signals (e.g., sensed current signals, etc.) may be indicative that the converter 100 is operating in the discontinuous mode when the current through at least one of the inductor 128 and the inductor 130 is discontinuous.

As mentioned above, the switches 114, 116, 118, 120, 122 and 124 are arranged in an interleaved circuit arrangement having two phases. Specifically, FIG. 1 illustrates a full bridge, totem-pole circuit arrangement. In other embodiments, the switches may be arranged in other suitable interleaved PFC circuit arrangements, such as a bridge rectifier followed by an interleaved continuous current boost PFC, an interleaved H-bridge PFC, etc.

As shown in FIG. 1, the pair of switches 114 and 116 are coupled in parallel with the pair of output terminals 108 and 110. A node 115 is defined between the switches 114 and 116, and is coupled with the inductor 128 to define the first phase of the interleaved circuit arrangement.

The pair of switches 118 and 120 are coupled in parallel with the pair of output terminals 108 and 110. A node 119 is defined between the switches 118 and 120, and is coupled with the inductor 130 to define the first phase of the interleaved circuit arrangement. The pair of the switches 122 and 124 are coupled in parallel with the pair of output terminals 108 and 110. A node 121 defined between the pair of switches 122 and 124 is coupled with the input terminal 104.

The switches 114, 116, 118, 120, 122 and 124 may comprise any suitable switching devices, such as metal-oxide semiconductor field-effect transistors (MOSFETs), including SiC FETs, GaN FETs, etc. Although the converter 100 includes two phases, other embodiments may include more than two phases.

The AC voltage input 106 may transition between positive and negative polarities at an input frequency (e.g., sixty Hz, etc.). The control circuit 126 may operate the pair of switches 122 and 124 at the input frequency, according to the polarity of the AC voltage input 106.

In response to the polarity of the AC voltage input 106 changing from the one polarity to an opposite polarity (e.g., from positive to negative or vice-versa), the control circuit 126 may change operation of the each switch 114, 116, 118 and 120, from synchronous operation to PFC active switch operation, or vice-versa.

Figure 2:
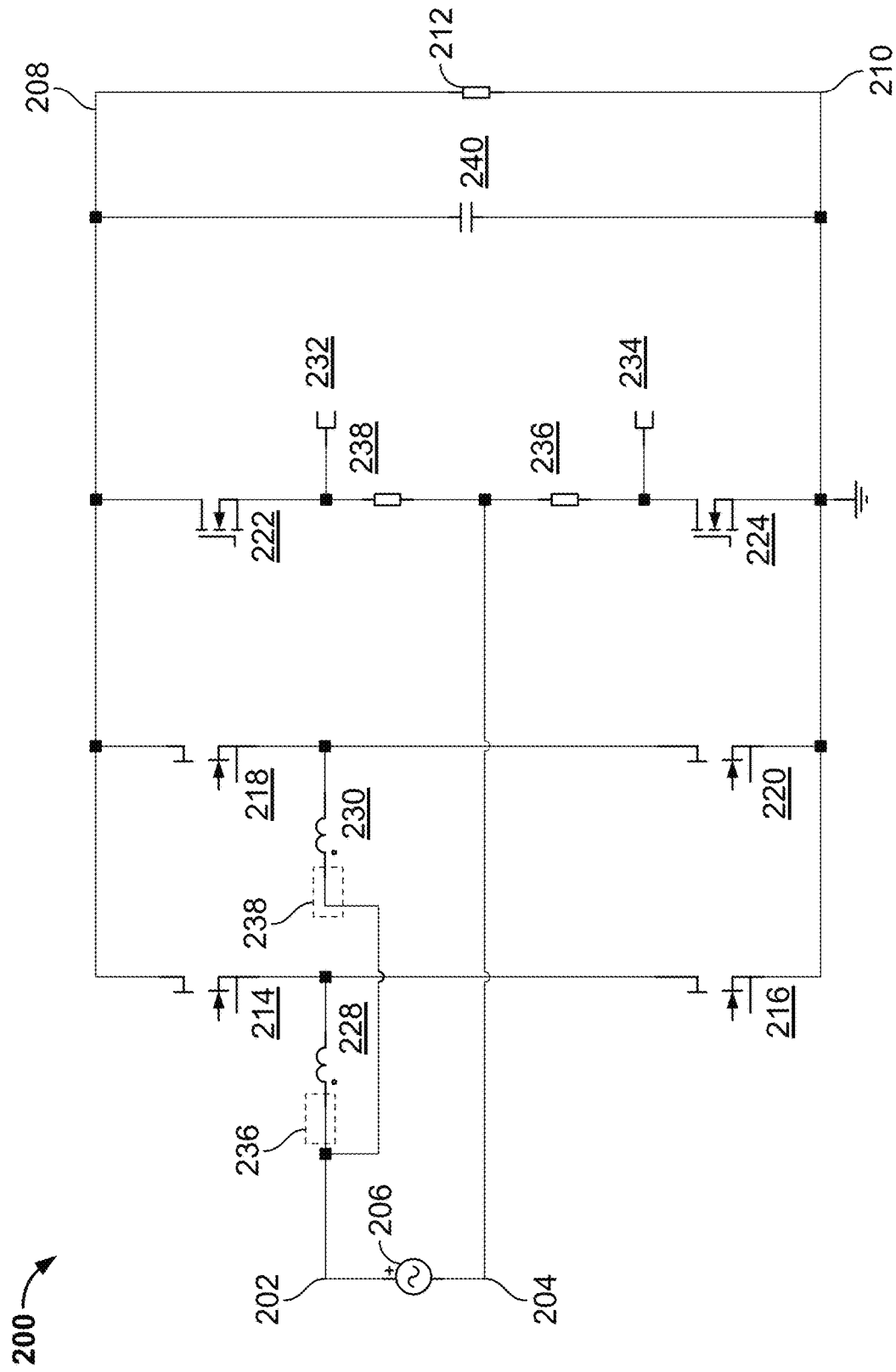
FIG. 2 is a circuit diagram of a multi-phase interleaved power converter including a current sensing circuit, according to one example embodiment of the present disclosure.

FIG. 2 illustrates a multi-phase interleaved power factor correction (PFC) converter 200, according to another example embodiment of the present disclosure. The converter 200 includes a pair of input terminals 202 and 204 for receiving an alternating current (AC) voltage input from a voltage source 206, and a pair of output terminals 208 and 210 for supplying a direct current (DC) voltage output to a load 212.

The converter 200 includes six switches 214, 216, 218, 220, 222 and 224 coupled in a multi-phase interleaved circuit arrangement between the pair of input terminals 202, 204 and the pair of output terminals 208, 210. A control circuit (not shown in FIG. 2) may be coupled to control switching operation of the switches 214, 216, 218, 220, 222 and 224.

During a first polarity of the AC voltage input 206, the switch 214 may be operated as a power factor correction (PFC) active switch having an off-time as a function of a duty cycle of a pulse-width modulation (PWM) signal, and the switch 216 may be operated as a synchronous switch (e.g., synchronous to operation of the switch 214, etc.).

The control circuit may be configured to receive one or more signals indicative of the currents in each phase of the interleaved circuit arrangement. For example, the control circuit may receive a sensed current signal from one or more current sensors, the control circuit may itself sense a current to receive the signal(s), etc.

The one or more control signals may include a sensed current indicative of a sum of the currents in each phase of the interleaved circuit arrangement. For example, FIG. 2 illustrates a current sensing circuit having a current sense node 232 and a current sense return node 234.

The current sensing circuit may include any suitable element(s) for sensing a current that is indicative of a sum of currents in the phases of the converter 200, such as a current sensor (e.g., a current sense resistor), etc. For example, the current sensing circuit may sense a current indicative of a sum of the currents in the inductors 228 and 230, a sum of the currents through the pair of switches 214, 216 and the pair of switches 218, 220, etc.

As shown in FIG. 2, the current sensing circuit is coupled between the pair of switches 222 and 224. Specifically, the current sense node 232 is located between the switch 222 and a resistor 238, and the current sense return node 234 is located between the switch 224 and the resistor 236. In other embodiments, the current sensing circuit may be connected at other suitable locations in the converter 200 that allow for sensing a common current of all phases of the converter 200.

As shown in FIG. 2, the converter 200 may include a single current sensing circuit. The single current sensing circuit senses current that passes through the resistors 236 and 238, which represents the sum of currents for all phases of the converter 200.

If the sensed current is less than a boundary condition, the sensed current may indicate that the converter 200 is operating in a discontinuous mode. For example, if the sensed current is less than the boundary condition, the current through one of the phases (e.g., through the inductor 228 or 230), may be discontinuous.

The boundary condition may be any condition suitable for indicating that the current through at least one of the phases is discontinuous. The boundary condition may be determined empirically. For example, the synchronous switches may be set to off, so the converter 200 operates in a discontinuous mode (e.g., without negative current).

The load 212 may be increased until a maximum ripple current of a single phase is reached at the boundary condition (an example boundary condition is shown at 315 in FIG. 3, and example single-phase ripple currents are shown at 301 and 303 in FIG. 4, as explained further below).

A sum of the ripple currents is determined, and the boundary condition may be set equal to a peak of the summed currents, including an optional margin value. In an example embodiment, a peak of the summed currents may be about 5.1 A and the margin may be set to between zero to two Amps. In other embodiments, other peak summed current values and margins (or no margin) may be used.

Once the boundary condition is set, if the sensed total sum current of the phases is below the boundary condition, the on-time for the synchronous switches may be calculated as SynchSwitch_ON=Vac*D/(Vo−Vac), where D is the duty cycle for turn on of the corresponding active switch, Vac is a value of the AC voltage input 206 (e.g., a current value, a maximum value, etc.), and Vo is a value of the DC voltage output (e.g., a current value, a maximum value, an RMS value, etc.). The calculated SynchSwitch_ON may be applied to the synchronous switch of each phase of the converter 200. This may inhibit negative current flow from the capacitor 240 back to the AC voltage input 206.

The above equation may be derived from a magnetics product equation V*T, where Vin*Ton=Voff*Toff. If the sensed current is above the boundary condition, each phase may be operating in a continuous mode and the SynchSwitch_ON time may be equal to 1−D.

The converter 200 may provide an advantage where only a single current sensing circuit is used to sense a sum current of all phases of the converter 200, and then the sensed sum current is compared to a boundary condition to determine whether at least one of the phases is operating in a discontinuous mode. Using a single sensed sum current may reduce cost, increase efficiency, reduce part count, reduce design complexity, reduce a size of the converter 200, reduce available space within the converter 200, etc., as compared to using a separate current sense for each phase.

Optionally, separate current senses may be used for each phase of the interleaved circuit arrangement. For example, FIG. 2 illustrates an optional current sense 236 for sensing a first phase current and an optional current sense 238 for sensing a second phase circuit. The current senses 236 and 238 may each provide an sensed current signal for an individual phase to the control circuit, for the control circuit to determine whether one or more phases are operating in a discontinuous mode (e.g., because the individual phase current is below a boundary condition, is zero, is less than zero, etc.).

Figure 3:
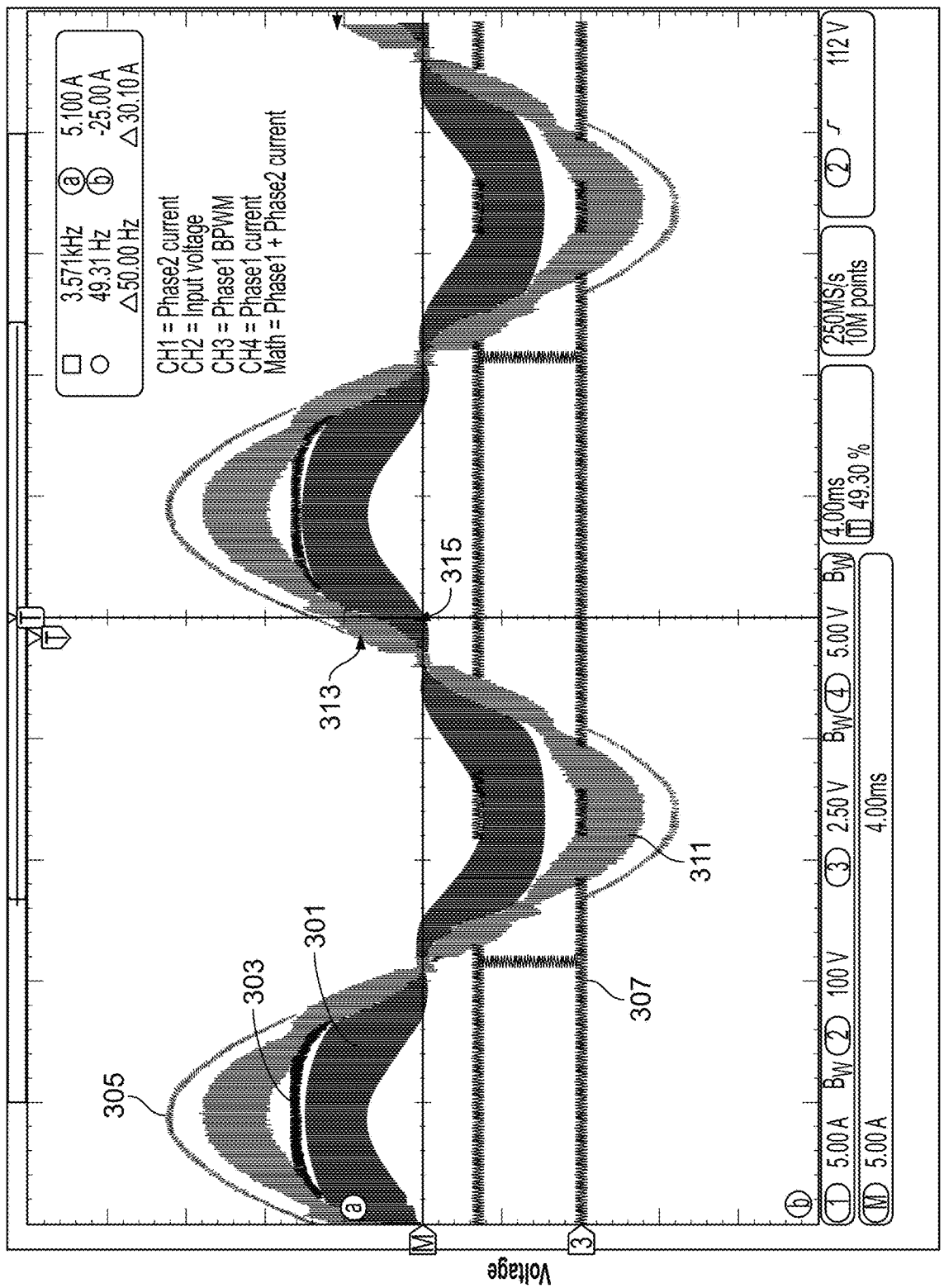
FIG. 3 is a graph of example voltage and current waveforms of the power converter of FIG. 2.

FIG. 3 illustrates example current and waveforms of the converter 200 of FIG. 2. As shown in FIG. 3, a first phase current 301 (e.g., though the inductor 228), and a second phase current 303 (e.g., through the inductor 230), oscillate according to a polarity and magnitude of the AC input voltage 305. A BPWM signal 307 of the first phase is supplied to the currently synchronous switch in the first phase, according to the polarity of the AC input voltage 305.

A sensed current 311 is a sum of the first phase current 301 and the second phase current 303 may be compared to a boundary condition 313. If the sensed current 311 is less than the boundary condition 313, the converter 200 may determine that a discontinuous mode of operation has started at 315.

Figure 4:
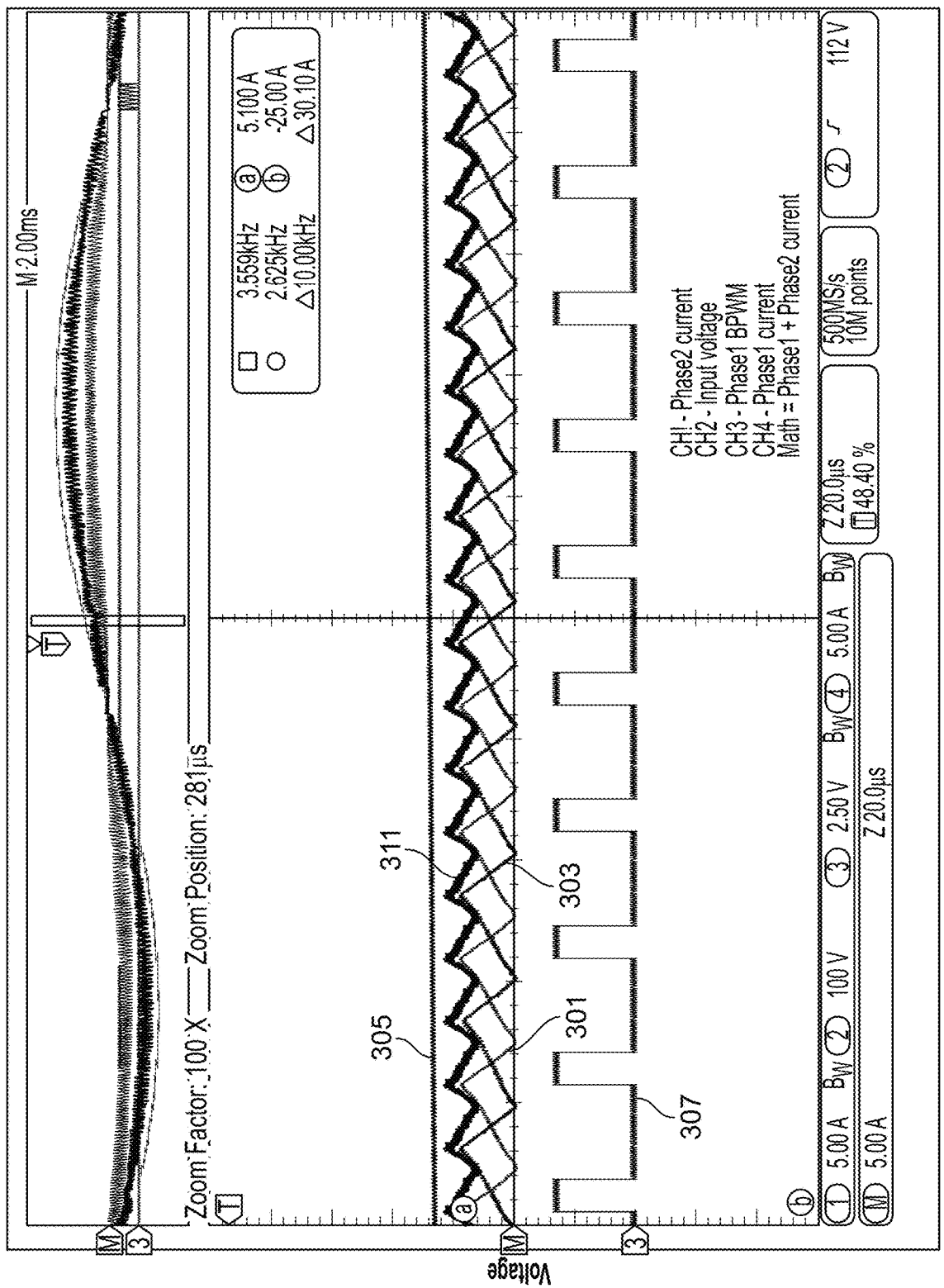
FIG. 4 is a graph of a portion of the example voltage and current waveforms of FIG. 3 on a smaller time scale.

FIG. 4 illustrates a selected portion of the example current and waveforms of FIG. 3, where the time scale has been zoomed-in to illustrate the first phase current 301, the second phase current 303 and the sensed current 311, with respect to pulses of the BPWM signal 307.

As shown in FIG. 4, when the BPWM signal 307 is high the first phase current 301 decreases, and when the BPWM signal is low the first phase current 301 increases. The second phase current 303 operates at an approximately 180 degree opposite phase to the first phase current 301.

The sensed current 311 is a sum of the first phase current 301 and the second phase current 303. The sensed current 311 oscillates according to the frequency of the phase currents 301 and 303. When the sensed current 311 is below a boundary condition, the converter 200 may be determined as operating in a discontinuous mode.

As described herein, the example converters and control circuits may include a microprocessor, microcontroller, integrated circuit, digital signal processor, etc., which may include memory. The converters and control circuits may be configured to perform (e.g., operable to perform, etc.) any of the example processes described herein using any suitable hardware and/or software implementation. For example, the converters and control circuits may execute computer-executable instructions stored in a memory, may include one or more logic gates, control circuitry, etc. Example control circuits may turn on and turn off (e.g., operate) switches by supplying suitable control signals to the gates of the switches, etc.

According to another aspect of the present disclosure, a method of controlling a multi-phase interleaved power factor correction (PFC) converter is disclosed. The converter includes a pair of input terminals for receiving an alternating current (AC) voltage input from a voltage source, a pair of output terminals for supplying a direct current (DC) voltage output to a load, and at least six switches coupled in a multi-phase interleaved circuit arrangement between the pair of input terminals and the pair of output terminals.

The method includes, during a first polarity of the AC voltage input, operating a first one of the at least six switches as a power factor correction (PFC) active switch having an off-time specified according to a duty cycle of a pulse-width modulation (PWM) signal, and operate a second one of the switches as a synchronous switch corresponding to operation of the first switch.

The method also includes sensing a current indicative of a sum of the currents in each phase of the interleaved circuit arrangement, and in response to the sensed current indicating that the converter is operating in a continuous mode, setting an on-time of the second switch equal to the off-time of the first switch. The method further includes, in response to the sensed current indicating that the converter is operating in a discontinuous mode, setting the on-time of the second switch less than the off-time of the first switch.

In some embodiments, the converter includes a first inductor coupled between the pair of input terminals and a first pair of the switches, and a second inductor coupled between the pair of input terminals and a second pair of the switches. The sensed current is indicative that the converter is operating in the discontinuous mode when the current through at least one of the first inductor and the second inductor is discontinuous.

The switches may be coupled in any suitable circuit arrangement having at least two phases, such as a full bridge totem-pole circuit, a bridge rectifier followed by an interleaved continuous current boost PFC, an interleaved H-bridge PFC, etc. For example, a first pair of the switches may be coupled in parallel with the pair of output terminals, with a node defined between the first pair of switches coupled with the first inductor to define a first one of the at least two phases of the interleaved circuit arrangement.

A second pair of the switches may be coupled in parallel with the pair of output terminals, with a node defined between the second pair of switches coupled with the second inductor to define a second one of the at least two phases of the interleaved circuit arrangement. A third pair of the switches may be coupled between in parallel with the pair of output terminals, with a node defined between the third pair of switches is coupled with one of the pair of input terminals.

The AC voltage input may transition between positive and negative voltage polarities at an input frequency, and the method may include operating the third pair of switches at the input frequency, according to the polarity of the AC voltage input. Sensing the current may include sensing the current via a current sensor coupled between the third pair of switches.

In some embodiments, in response to the polarity of the AC voltage input changing from the first polarity to a second polarity opposite the first polarity, the method may include changing operation of the first switch to synchronous operation and changing operation of the second switch to PFC active switch operation.

The converter may include a capacitor coupled in parallel with the pair of output terminals, and setting the on-time of the second switch may include, in response to the sensed current indicating that the converter is operating in a discontinuous mode, setting the on-time of the second switch to a duration that inhibits negative current flow from the capacitor back to the pair of input terminals. The duration may be determined by multiplying a value of the AC voltage input by the duty cycle of the first switch, and dividing the multiplication result by a difference between a value of the DC voltage output and the value of the AC voltage input.

In some embodiments, the method may include determining that the sensed current is indicative that the converter is operating in the discontinuous mode when the sensed current is less than a specified current boundary condition.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A multi-phase interleaved power factor correction (PFC) converter, comprising:
at least six switches coupled in a multi-phase interleaved circuit arrangement; and
a control circuit coupled to the at least six switches, the control circuit configured to:
during a first polarity of an AC input voltage, turn on and turn off a first one of the at least six switches according to a pulse-width modulation (PWM) signal to operate the first switch as a power factor correction (PFC) active switch having an off-time as a function of a duty cycle of the PWM signal, while turning on and turning off a second one of the at least six switches as a synchronous switch;
receive one or more signals indicative of the currents in each phase of the interleaved circuit arrangement;
in response to the one or more signals indicating that the converter is operating in a continuous mode, set an on-time of the a second switch equal to the off-time of the first switch; and
in response to the one or more signals indicating that the converter is operating in a discontinuous mode, set the on-time of the second switch to a duration less than the off-time of the first switch.

2. The converter of claim 1, further comprising:
a pair of input terminals for receiving the AC input voltage from a voltage source;
a pair of output terminals for supplying a direct current (DC) output voltage to a load;
a first inductor coupled between an input terminal and a first pair of the at least six switches; and
a second inductor coupled between the input terminal and a second pair of the at least six switches;
wherein the at least six switches are arranged between the pair of input terminals and the pair of output terminals.

3. The converter of claim 2, wherein the control circuit is configured to determine that the converter is operating in the discontinuous mode when the one or more signals indicate that the current through at least one of the first inductor and the second inductor is discontinuous.

4. The converter of claim 2, wherein the at least six switches are coupled in a full bridge, totem-pole circuit arrangement having at least two phases.

5. The converter of claim 4, wherein:
the first pair of the at least six switches are coupled in parallel with the pair of output terminals, and a node defined between the first pair of switches is coupled with the first inductor to define a first one of the at least two phases of the interleaved circuit arrangement;
the second pair of the at least six switches are coupled in parallel with the pair of output terminals, and a node defined between the second pair of switches is coupled with the second inductor to define a second one of the at least two phases of the interleaved circuit arrangement; and
a third pair of the at least six switches are coupled in parallel with the pair of output terminals, and a node defined between the third pair of switches is coupled with the other one of the pair of input terminals.

6. The converter of claim 5, wherein:
the AC input voltage transitions between positive and negative voltage polarities at an input frequency; and
the control circuit is configured to operate the third pair of switches at the input frequency, wherein each of the third pair of switches is switched on and off according to the polarity of the AC input voltage.

7. The converter of claim 5, further comprising a current sensor coupled to sense the current indicative of the sum of the currents in the at least two phases.

8. The converter of claim 7, wherein the current sensor is coupled between the third pair of switches.

9. The converter of claim 2, wherein the control circuit is configured to, in response to the polarity of the AC input voltage changing from the first polarity to a second polarity opposite the first polarity, change operation of the first switch to synchronous operation and change operation of the second switch to PFC active switch operation.

10. The converter of claim 2, further comprising a capacitor coupled in parallel with the pair of output terminals.

11. The converter of claim 10, wherein the control circuit is configured to, in response to the one or more signals indicating that the converter is operating in the discontinuous mode, set the on-time of the second switch to a duration that inhibits negative current flow from the capacitor back to the AC input voltage.

12. The converter of claim 11, wherein the control circuit is configured to determine the duration by multiplying a value of the AC input voltage by the duty cycle of the first switch, and dividing the multiplication result by a difference between a value of the DC output voltage and the value of the AC input voltage.

13. The converter of claim 1, wherein the one or more signals include a first signal indicative of a current through a first phase of the interleaved circuit arrangement and a second signal indicative of a current through a second phase of the interleaved circuit arrangement.

14. The converter of claim 1, wherein the one or more signals comprises a single signal indicative of a sum of the current through each phase of the interleaved circuit arrangement.

15. The converter of claim 14, wherein the control circuit is configured to determine that the converter is operating in the discontinuous mode when the single signal indicates that the sum of the current through each phase is less than a specified current boundary condition.

16. A method of manufacturing a multi-phase interleaved power factor correction (PFC) converter comprising:
coupling six switches in a multi-phase interleaved circuit arrangement;
coupling a control circuit to the six switches; and
configuring the control circuit to:
during a first polarity of an AC voltage input, turn on and turn off a first one of the six switches according to a pulse-width modulation (PWM) signal to operate the first switch as a power factor correction (PFC) active switch having an off-time as a function of a duty cycle of the PWM signal, while turning on and turning off a second one of the six switches as a synchronous switch;
sensing a current indicative of a sum of the currents in each phase of the interleaved circuit arrangement;
in response to the sensed current indicating that the converter is operating in a continuous mode, setting an on-time of the second switch equal to the off-time of the first switch; and
in response to the sensed current indicating that the converter is operating in a discontinuous mode, setting the on-time of the second switch less than the off-time of the first switch.

17. The method of claim 16 further comprising:
coupling the six switches between a pair of input terminals and a pair of output terminals;
coupling a first inductor between one of the pair of input terminals and a first pair of the six switches; and
coupling a second inductor coupled between the one of the pair of input terminals and a second pair of the six switches.

18. The method of claim 17, wherein the sensed current is indicative that the converter is operating in the discontinuous mode when the current through at least one of the first inductor and the second inductor is discontinuous.

19. The method of claim 17, wherein coupling the six switches in the multi-phase interleaved circuit arrangement comprises coupling six switches in a full bridge, totem-pole circuit arrangement having at least two phases.

20. The method of claim 18 further comprising configuring the control circuit to change operation of the first switch to synchronous operation and change operation of the second switch to PFC active switch operation in response to the polarity of the AC input voltage changing from the first polarity to a second polarity opposite the first polarity.

* * * * *